(12) United States Patent
Wang et al.

(10) Patent No.: US 11,343,007 B2
(45) Date of Patent: May 24, 2022

(54) TIME SYNCHRONIZATION METHOD AND DEVICE

(71) Applicant: HUAWEI TECHNOLOGIES CO., LTD., Shenzhen (CN)

(72) Inventors: Jinhui Wang, Dongguan (CN); Song Liu, Dongguan (CN); Hongwei Niu, Chengdu (CN); Yunlei Qi, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 35 days.

(21) Appl. No.: 16/730,027

(22) Filed: Dec. 30, 2019

(65) Prior Publication Data

US 2020/0136737 A1 Apr. 30, 2020

Related U.S. Application Data

(63) Continuation of application No. PCT/CN2017/091267, filed on Jun. 30, 2017.

(51) Int. Cl.
*H04J 3/06* (2006.01)

(52) U.S. Cl.
CPC ............ *H04J 3/067* (2013.01); *H04J 3/0655* (2013.01); *H04J 3/0667* (2013.01); *H04J 3/0673* (2013.01)

(58) Field of Classification Search
CPC ........ H04J 3/067; H04J 3/0655; H04J 3/0667; H04J 3/0673; H04J 3/06; H04W 56/00
See application file for complete search history.

(56) References Cited

U.S. PATENT DOCUMENTS

2007/0223496 A1 9/2007 Izumi
2012/0148248 A1 6/2012 Li
(Continued)

FOREIGN PATENT DOCUMENTS

CN 101499871 A 8/2009
CN 101547083 A 9/2009
(Continued)

OTHER PUBLICATIONS

Extended European search report dated Apr. 21, 2020 from corresponding application No. EP 17916220.1.
(Continued)

*Primary Examiner* — Omer S Mian
(74) *Attorney, Agent, or Firm* — Hauptman Ham, LLP

(57) ABSTRACT

A time synchronization method includes receiving, by a receive-end device, a first timestamp and a first header signal sent by a transmit-end device, where the first timestamp indicates a first moment at which a first channel medium conversion module sends the first header signal, and a second moment at which the receive-end device receives the first header signal. The method further includes sending a second header signal to the transmit-end device, where a third moment at which the receive-end device sends the second header signal. The method further includes receiving a fourth timestamp sent by the transmit-end device, where the fourth timestamp indicates a fourth moment at which the transmit-end device receives the second header signal. The method further includes synchronizing time with the transmit-end device based on the first moment, the second moment, the third moment, and the fourth moment.

20 Claims, 6 Drawing Sheets

(56) References Cited

U.S. PATENT DOCUMENTS

| | | |
|---|---|---|
| 2013/0343409 A1 | 12/2013 | Haulin |
| 2014/0177653 A1 | 6/2014 | Tzeng |
| 2015/0092793 A1 | 4/2015 | Aweya |
| 2015/0139251 A1* | 5/2015 | Tzeng .................. H04J 3/0697 370/503 |
| 2015/0172220 A1 | 6/2015 | Rahamim et al. |
| 2020/0389407 A1* | 12/2020 | Pasio ................ H04W 28/0236 |

FOREIGN PATENT DOCUMENTS

| | | |
|---|---|---|
| CN | 102130735 A | 7/2011 |
| CN | 102387155 A | 3/2012 |
| CN | 102957489 A | 3/2013 |
| CN | 202772918 U | 3/2013 |

OTHER PUBLICATIONS

IEEE 1588V2,IEEE Std 1588-2008 (Revision of IEEE Std 1588-2002),IEEE Standard for a Precision Clock Synchronization Protocol for Networked Measurement and Control Systems,IEEE Instrumentation and Measurement Society,Technical Committee on Sensor Technology (TC-9),dated Jul. 24, 2008,total 289 pages.

Chinese Notice of Allowance issued in corresponding Chinese Application No. 2017800139815, dated Apr. 14, 2021, pp. 1-4.

European Office Action issued in corresponding European Application No. 17916220.1, dated Dec. 17, 2021, pp. 1-6, European Patent Office, Rijswijk, Netherlands.

\* cited by examiner

TIME SYNCHRONIZATION METHOD AND DEVICE

CROSS-REFERENCE TO RELATED APPLICATIONS

This application is a continuation of International Application No. PCT/CN2017/091267, filed on Jun. 30, 2017, which is hereby incorporated by reference in its entirety.

TECHNICAL FIELD

The present disclosure relates to the field of communications technologies, and specifically, to a time synchronization method and a device.

BACKGROUND

In a communications network, normal service operation sometimes requires network time synchronization. In other words, a time difference between devices in the network is kept at a proper error level. The 1588V2 protocol is a precise time synchronization protocol, and is referred to as a precision time protocol (PTP) for short. The 1588V2 protocol can be used to implement time synchronization between a plurality of network devices.

In the 1588V2 protocol, time of a receive-end device and time of a transmit-end device may be synchronized by using both software and hardware. A stamping point may be defined in a protocol stack. In the receive-end device that needs to be synchronized, a timestamp is generated when a PTP message passes the stamping point, and the timestamp is carried in the message. A time offset is calculated by exchanging the message with the transmit-end device, and is compensated for, to implement time synchronization between the receive-end device and the transmit-end device. To reduce uncertainty about a delay of transmitting the message from the stamping point to a physical layer medium, the stamping point needs to be located as close as possible to the physical layer medium.

When the PTP message is transmitted between the transmit-end device and the receive-end device, an information medium needs to be converted by using a channel medium conversion module. For example, a channel medium conversion module (for example, an optical module) in the transmit-end device converts, into a signal (for example, an optical signal) that can be transmitted in a corresponding channel medium, the PTP message that carries the timestamp; and the signal is sent to a channel medium conversion module in the receive-end device by using a channel medium (for example, an optical fiber). The channel medium conversion module in the receive-end device then converts the signal into an electric signal and identifies the electric signal. When the PTP message that carries the timestamp is converted in the channel medium conversion modules, a delay is unstable because of differences in signal processing types, signal processing amounts, and the like, affecting time synchronization precision.

SUMMARY

At least one embodiment of the present disclosure provides a time synchronization method and a device, to improve time synchronization precision.

According to at least one embodiment, a time synchronization method, including: receiving, by a receive-end device, a first timestamp sent by a transmit-end device, and receiving a first header signal sent by the transmit-end device, where the first header signal is sent by a first channel medium conversion module in the transmit-end device, the first timestamp indicates a first moment at which the first channel medium conversion module sends the first header signal, and a moment at which the receive-end device receives the first header signal is a second moment; sending, by the receive-end device, a second header signal to the transmit-end device, where the second header signal is generated by a second channel medium conversion module in the receive-end device, and a moment at which the receive-end device sends the second header signal is a third moment; receiving, by the receive-end device, a fourth timestamp sent by the transmit-end device, where the fourth timestamp indicates a fourth moment at which the transmit-end device receives the second header signal; and synchronizing, by the receive-end device, time with the transmit-end device based on the first moment, the second moment, the third moment, and the fourth moment. It can be learned that when the first channel medium conversion module in the transmit-end device receives or sends a header signal, the transmit-end device generates a timestamp; or when the second channel medium conversion module in the receive-end device receives or sends a header signal, the receive-end device generates a timestamp. In this way, a stamping point on a physical layer is moved to the channel medium conversion modules, so that a moment indicated by a timestamp is closer to a moment at which a signal enters or leaves a transmission medium. This reduces an uncertainty about a delay of transmitting a message between a stamping point and a physical layer medium and can improve precision of a timestamping moment, thereby improving precision of time synchronization between the receive-end device and the transmit-end device.

In at least one embodiment, the first moment is a moment at which a first stamping module in the transmit-end device receives a first trigger signal sent by the first channel medium conversion module, the second moment is a moment at which a second stamping module in the receive-end device receives a second trigger signal sent by the second channel medium conversion module, the third moment is a moment at which the second stamping module receives a third trigger signal sent by the second channel medium conversion module, and the fourth moment is a moment at which the first stamping module receives a fourth trigger signal sent by the first channel medium conversion module.

In at least one embodiment, the first header signal is received by the second channel medium conversion module, and after the second channel medium conversion module receives the first header signal sent by the first channel medium conversion module, the method further includes: sending, by the second channel medium conversion module, the second trigger signal to the second stamping module; and generating, by the second stamping module, a second timestamp when the second stamping module receives the second trigger signal, and sending the second timestamp to a processor in the receive-end device, where the second timestamp indicates the second moment.

In at least one embodiment, after the second channel medium conversion module sends the second header signal to the first channel medium conversion module, the method further includes: sending, by the second channel medium conversion module, the third trigger signal to the second stamping module; and generating, by the second stamping module, a third timestamp when the second stamping module receives the third trigger signal, and sending the third timestamp to the processor in the receive-end device, where the third timestamp indicates the third moment. When receiving a header signal, the first channel medium conversion module in the transmit-end device sends a trigger signal for triggering timestamping to the first stamping module, and the first stamping module generates a timestamp; or when receiving a header signal, the second channel medium conversion module in the receive-end device sends a trigger signal for triggering timestamping to the second stamping module, and the second stamping module generates a timestamp. In this way, a stamping point on a physical layer is moved to the channel medium conversion modules, so that a moment indicated by a timestamp is closer to a moment at which a signal enters or leaves a transmission medium. This reduces an uncertainty about a delay of transmitting a message between a stamping point and a physical layer medium and can improve precision of a timestamping moment, thereby improving precision of time synchronization between the receive-end device and the transmit-end device.

In at least one embodiment, the first channel medium conversion module and the second channel medium conversion module are optical modules; and the first header signal, the first timestamp, the second header signal, and the fourth timestamp are transmitted between the first channel medium conversion module and the second channel medium conversion module by using an optical fiber.

In at least one embodiment, the first channel medium conversion module and the second channel medium conversion module are electromagnetic wave conversion modules; and the first header signal, the first timestamp, the second header signal, and the fourth timestamp are transmitted between the first channel medium conversion module and the second channel medium conversion module by using an electromagnetic wave transmission medium.

According to at least one embodiment, a time synchronization method, including: sending, by a transmit-end device, a first timestamp to a receive-end device, and sending a first header signal to the receive-end device, where the first header signal is sent by a first channel medium conversion module in the transmit-end device, the first timestamp indicates a first moment at which the first channel medium conversion module sends the first header signal, and a moment at which the receive-end device receives the first header signal is a second moment; receiving, by the transmit-end device, a second header signal sent by the receive-end device, where the second header signal is sent by a second channel medium conversion module in the receive-end device, a moment at which the receive-end device sends the second header signal is a third moment, and a moment at which the transmit-end device receives the second header signal is a fourth moment; and sending, by the transmit-end device, a fourth timestamp to the receive-end device, so that the receive-end device can synchronize time with the transmit-end device based on the first moment, the second moment, the third moment, and the fourth moment, where the fourth timestamp indicates the fourth moment. It can be learned that when the first channel medium conversion module in the transmit-end device receives or sends a header signal, the transmit-end device generates a timestamp; or when the second channel medium conversion module in the receive-end device receives or sends a header signal, the receive-end device generates a timestamp. In this way, a stamping point on a physical layer is moved to the channel medium conversion modules, so that a moment indicated by a timestamp is closer to a moment at which a signal enters or leaves a transmission medium. This reduces an uncertainty about a delay of transmitting a message between a stamping point and a physical layer medium and can improve precision of a timestamping moment, thereby improving precision of time synchronization between the receive-end device and the transmit-end device.

In at least one embodiment, the first moment is a moment at which a first stamping module in the transmit-end device receives a first trigger signal sent by the first channel medium conversion module, the second moment is a moment at which a second stamping module in the receive-end device receives a second trigger signal sent by the second channel medium conversion module, the third moment is a moment at which the second stamping module receives a third trigger signal sent by the second channel medium conversion module, and the fourth moment is a moment at which the first stamping module receives a fourth trigger signal sent by the first channel medium conversion module.

In at least one embodiment, after the first channel medium conversion module sends the first header signal to the second channel medium conversion module, the method further includes: sending, by the first channel medium conversion module, the first trigger signal to the first stamping module; and generating, by the first stamping module, the first timestamp when the first stamping module receives the first trigger signal, and sending the first timestamp to a processor in the transmit-end device.

In at least one embodiment, the second header signal is received by the first channel medium conversion module, and after the first channel medium conversion module receives the second header signal sent by the second channel medium conversion module, the method further includes: sending, by the first channel medium conversion module, the fourth trigger signal to the first stamping module; and generating, by the first stamping module, the fourth timestamp when the first stamping module receives the fourth trigger signal, and sending the fourth timestamp to the processor in the transmit-end device. When receiving or sending a header signal, the first channel medium conversion module in the transmit-end device sends a trigger signal for triggering timestamping to the first stamping module, and the first stamping module generates a timestamp; or when receiving or sending a header signal, the second channel medium conversion module in the receive-end device sends a trigger signal for triggering timestamping to the second stamping module, and the second stamping module generates a timestamp. In this way, a stamping point on a physical layer is moved to the channel medium conversion modules, so that a moment indicated by a timestamp is closer to a moment at which a signal enters or leaves a transmission medium. This reduces an uncertainty about a delay of transmitting a message between a stamping point and a physical layer medium and can improve precision of a timestamping moment, thereby improving precision of time synchronization between the receive-end device and the transmit-end device.

In at least one embodiment, the sending, by a transmit-end device, a first moment to a receive-end device includes: sending, by the processor in the transmit-end device after receiving the first timestamp sent by the first stamping module, a synchronization message to the receive-end device by using the first channel medium conversion module, where the synchronization message carries the first timestamp.

In at least one embodiment, the sending, by the transmit-end device, a fourth timestamp to the receive-end device includes: sending, by the processor in the transmit-end device after receiving the fourth timestamp sent by the first stamping module, a delay response message to the receive-end device by using the first channel medium conversion module, where the delay response message carries the fourth timestamp.

According to at least one embodiment, a receive-end device, including a processor and a second channel medium conversion module, where the second channel medium conversion module is configured to receive a first timestamp sent by a transmit-end device and receive a first header signal sent by the transmit-end device, where the first header signal is sent by a first channel medium conversion module in the transmit-end device, the first timestamp indicates a first moment at which the first channel medium conversion module sends the first header signal, and a moment at which the receive-end device receives the first header signal is a second moment;

the second channel medium conversion module is further configured to send a second header signal to the transmit-end device, where a moment at which the second channel medium conversion module sends the second header signal is a third moment;

the second channel medium conversion module is further configured to receive a fourth timestamp sent by the transmit-end device, where the fourth timestamp indicates a fourth moment at which the transmit-end device receives the second header signal; and the processor is configured to synchronize time with the transmit-end device based on the first moment, the second moment, the third moment, and the fourth moment.

In at least one embodiment, the receive-end device further includes a second stamping module, the first moment is a moment at which a first stamping module in the transmit-end device receives a first trigger signal sent by the first channel medium conversion module, the second moment is a moment at which the second stamping module in the receive-end device receives a second trigger signal sent by the second channel medium conversion module, the third moment is a moment at which the second stamping module receives a third trigger signal sent by the second channel medium conversion module, and the fourth moment is a moment at which the first stamping module receives a fourth trigger signal sent by the first channel medium conversion module.

In at least one embodiment, after the second channel medium conversion module receives the first header signal sent by the first channel medium conversion module, the second channel medium conversion module is further configured to send the second trigger signal to the second stamping module; and the second stamping module is configured to generate a second timestamp when receiving the second trigger signal, and send the second timestamp to the processor, where the second timestamp indicates the second moment.

In at least one embodiment, after the second channel medium conversion module sends the second header signal to the first channel medium conversion module, the second channel medium conversion module is further configured to send the third trigger signal to the second stamping module; and the second stamping module is further configured to generate a third timestamp when receiving the third trigger signal, and send the third timestamp to the processor, where the third timestamp indicates the third moment.

According to at least one embodiment, a transmit-end device, including a processor and a first channel medium conversion module, where the first channel medium conversion module is configured to send a first timestamp to a receive-end device and send a first header signal to the receive-end device, where the first header signal is sent by the first channel medium conversion module in the transmit-end device, the first timestamp indicates a first moment at which the first channel medium conversion module sends the first header signal, and a moment at which the receive-end device receives the first header signal is a second moment;

the first channel medium conversion module is further configured to receive a second header signal sent by the receive-end device, where the second header signal is sent by a second channel medium conversion module in the receive-end device, a moment at which the receive-end device sends the second header signal is a third moment, and a moment at which the transmit-end device receives the second header signal is a fourth moment;

the first channel medium conversion module is further configured to send a fourth timestamp to the receive-end device, so that the receive-end device can synchronize time with the transmit-end device based on the first moment, the second moment, the third moment, and the fourth moment, where the fourth timestamp indicates the fourth moment; and the processor is configured to communicate with the first channel medium conversion module.

In at least one embodiment, the transmit-end device further includes a first stamping module, the first moment is a moment at which the first stamping module receives a first trigger signal sent by the first channel medium conversion module, the second moment is a moment at which a second stamping module in the receive-end device receives a second trigger signal sent by the second channel medium conversion module, the third moment is a moment at which the second stamping module receives a third trigger signal sent by the second channel medium conversion module, and the fourth moment is a moment at which the first stamping module receives a fourth trigger signal sent by the first channel medium conversion module.

In at least one embodiment, after the first channel medium conversion module sends the first header signal to the second channel medium conversion module, the first channel medium conversion module is further configured to send the first trigger signal to the first stamping module; and the first stamping module is configured to generate the first timestamp when receiving the first trigger signal, and send the first timestamp to the processor in the transmit-end device.

In at least one embodiment, the first channel medium conversion module is further configured to send the fourth trigger signal to the first stamping module after receiving the second header signal sent by the second channel medium conversion module; and the first stamping module is further configured to generate the fourth timestamp when receiving the fourth trigger signal, and send the fourth timestamp to the processor in the transmit-end device.

In at least one embodiment, the first channel medium conversion module is configured to send a first timestamp to a receive-end device includes: the processor in the transmit-end device sends, after receiving the first timestamp sent by the first stamping module, a synchronization message to the receive-end device by using the first channel medium conversion module, where the synchronization message carries the first timestamp.

In at least one embodiment, the first channel medium conversion module is further configured to send a fourth timestamp to the receive-end device includes: the processor in the transmit-end device sends, after receiving the fourth timestamp sent by the first stamping module, a delay response message to the receive-end device by using the first channel medium conversion module, where the delay response message carries the fourth timestamp.

According to at least one embodiment, a receive-end device, where the receive-end device includes a module or a unit configured to perform the time synchronization method according to any one of the first aspect or the possible implementations of the first aspect.

According to at least one embodiment, a transmit-end device, where the transmit-end device includes a module or a unit configured to perform the time synchronization method according to any one of the second aspect or the possible implementations of the second aspect.

According to at least one embodiment, a communications system includes a transmit-end device and a receive-end device. The receive-end device is the receive-end device according to the third aspect or the fifth aspect, and the transmit-end device is the transmit-end device according to the fourth aspect or the sixth aspect.

According to at least one embodiment, a computer readable storage medium includes an instruction. When the instruction is run on a receive-end device, the receive-end device is enabled to perform the time synchronization method according to any one of the first aspect or the possible implementations of the first aspect.

According to at least one embodiment, a computer readable storage medium includes an instruction. When the instruction is run on a transmit-end device, the transmit-end device is enabled to perform the time synchronization method according to any one of the second aspect or the possible implementations of the second aspect.

According to at least one embodiment, a computer program product includes an instruction. When the instruction is run on a receive-end device, the receive-end device is enabled to perform the time synchronization method according to any one of the first aspect or the possible implementations of the first aspect.

According to at least one embodiment, a computer program product includes an instruction. When the instruction is run on a transmit-end device, the transmit-end device is enabled to perform the time synchronization method according to any one of the second aspect or the possible implementations of the second aspect.

During implementation of the embodiments of the present disclosure, when receiving or sending a header signal, the first channel medium conversion module in the transmit-end device sends a trigger signal for triggering timestamping to the first stamping module, and the first stamping module generates a timestamp; or when receiving or sending a header signal, the second channel medium conversion module in the receive-end device sends a trigger signal for triggering timestamping to the second stamping module, and the second stamping module generates a timestamp. In the foregoing solution, a stamping point on a physical layer is moved to the channel medium conversion modules, so that a moment indicated by a timestamp is closer to a moment at which a signal enters or leaves a transmission medium. This reduces an uncertainty about a delay of transmitting a message between a stamping point and a physical layer medium and can improve precision of a timestamping moment, thereby improving precision of time synchronization between the receive-end device and the transmit-end device.

DETAILED DESCRIPTION

To make a person skilled in the art understand the solutions in the present disclosure better, the following describes several embodiments in more detail with reference to the accompanying drawings and implementations. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure.

At least one embodiment of the present disclosure provides a time synchronization method and a device, to improve time synchronization precision. The time synchronization method and the device are separately described in detail below.

Figure 1:
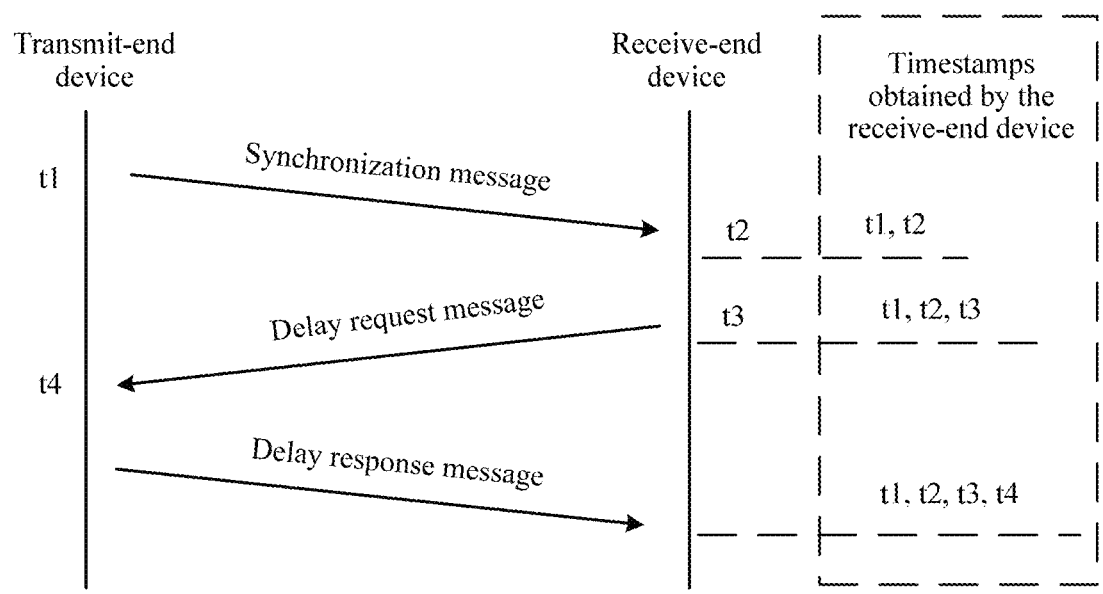
FIG. 1 is a schematic diagram of a principle of time synchronization in the 1588V2 protocol according to at least an embodiment of the present disclosure.

To facilitate better understanding of the embodiments of the present disclosure, the following first describes an application scenario used in the embodiments of the present disclosure. In a communications network, time of different base stations needs to be synchronized, and time synchronization precision needs to meet specified precision. The 1588V2 protocol may be used to resolve an issue concerning time synchronization between the base stations. FIG. 1 is a schematic diagram of a principle of time synchronization in the 1588V2 protocol according to an embodiment of the present disclosure. As shown in FIG. 1, a receive-end device and a transmit-end device interact with each other by using a message carrying a timestamp, and the receive-end device synchronizes time with the transmit-end device based on the time stamp. Specifically, the transmit-end device sends a synchronization message at a moment t1; and adds, to the synchronization message, a timestamp t1 that indicates the moment t1. The receive-end device receives the synchronization message at a moment t2; generates, locally at the receive-end device, a timestamp t2 that indicates the moment t2; and extracts the timestamp t1 from the synchronization message. The receive-end device sends a delay request message at a moment t3; and generates, locally at the receive-end device, a timestamp t3 that indicates the moment t3. The transmit-end device receives the delay request message at a moment t4; and generates, locally at the transmit-end device, a timestamp t4 that indicates the moment t4. The transmit-end device adds the timestamp t4 to a delay response message, and sends the delay response message to the receive-end device. The receive-end device extracts the timestamp t4 from the delay response message. The receive-end device may calculate a time deviation between the receive-end device and the transmit-end device based on the obtained timestamps t1, t2, t3, and t4; and adjust time of the receive-end device, to synchronize time with the transmit-end device. The time deviation is specifically calculated as follows: It is assumed that a path delay from the transmit-end device to the receive-end device is equal to a path delay from the receive-end device to the transmit-end device, and both path delays are A; in other words, a receive link delay is equal to a transmit link delay; and that the time deviation between the receive-end device and the transmit-end device is B. Then, it can be obtained that:

$$\begin{cases} t2 - t1 = A + B \\ t4 - t3 = A - B \end{cases}.$$

Then, it can be obtained that the time deviation B=[(t2−t1)−(t4−t3)]/2.

A timestamp is information about a moment on a clock of the transmit-end device or the receive-end device when the transmit-end device or the receive-end device makes a stamp. The timestamp is, for example, a character string or coded information. The transmit-end device and the receive-end device may be ports, modules, network devices, and the like that need to synchronize time. The synchronization message, the delay request message, and the delay response message may be transmitted in a form of packet.

Figure 2:
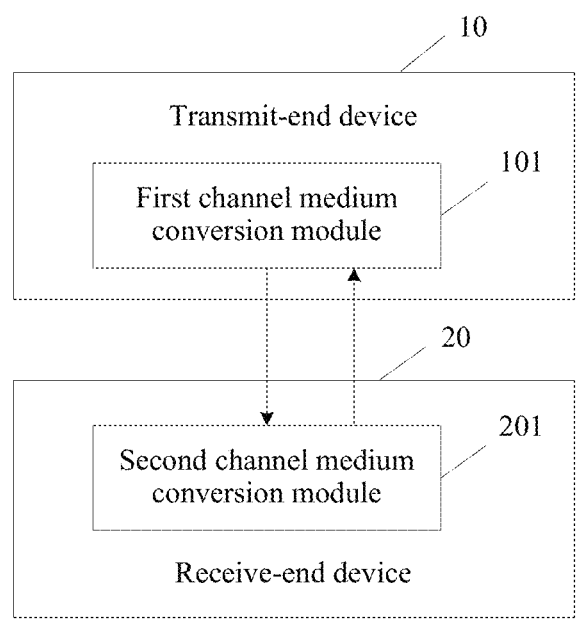
FIG. 2 is a schematic architectural diagram of a system according to at least an embodiment of the present disclosure.

To facilitate better understanding of the embodiments of the present disclosure, the following first describes an architecture of a system used in the embodiments of the present disclosure. FIG. 2 is a schematic architectural diagram of a system according to an embodiment of the present disclosure. As shown in FIG. 2, the system may include a transmit-end device 10 and a receive-end device 20. The system may use the 1588V2 protocol to synchronize time between the receive-end device 20 and the transmit-end device 10. The transmit-end device 10 includes a first channel medium conversion module 101, and the receive-end device 20 correspondingly includes a second channel medium conversion module 201. The transmit-end device 10 and the receive-end device 20 may transmit messages to each other. The messages generated by the transmit-end device 10 and the receive-end device 20 carry timestamps. The transmit-end device 10 and the receive-end device 20 each send the generated message to a local channel medium conversion module. Before the message leaves a local device, a local channel medium conversion module in the local device needs to process the message. For example, the transmit-end device 10 generates a message that carries a timestamp, and sends the message to the first channel medium conversion module 101. The first channel medium conversion module 101 converts the message into a signal that can be transmitted in a transmission medium, and transfers the signal to the receive-end device 20 by using the transmission medium. The first channel medium conversion module 101 and the second channel medium conversion module 201 may be optical modules; and are configured to carry, on an optical wave, a message that carries a time stamp, and transmit the message to a peer-end device by using an optical fiber.

The first channel medium conversion module 101 and the second channel medium conversion module 201 may be channel medium conversion modules of another type, for example, electromagnetic wave conversion modules; and are configured to carry a message on an electromagnetic wave (for example, a microwave), and transmit the message to a peer-end device. This is not limited in this embodiment.

To ensure accuracy of a time deviation, the 1588V2 protocol requires that a transmit delay be symmetrical to a receive delay. Using the transmit-end device 10 as an example, if a delay in a transmit link by which the transmit-end device 10 sends a message to the receive-end device 20 is the transmit delay, a delay in a receive link by which the transmit-end device 10 receives a message sent by the receive-end device 20 is the receive delay. The transmit delay and the receive delay are collectively referred to as a link delay. In the transmit-end device 10, it is assumed that a time span from a moment at which a message passes through a protocol stack and a timestamp is generated to a moment at which the message leaves the first channel medium conversion module 101 is a first time span, and it is assumed that a time span from a moment at which the message enters the first channel medium conversion module 101 to a moment at which the first channel medium conversion module 101 completes processing and the message enters the protocol stack is a second time span. Then, the first time span needs to be equal to the second time span, or a difference between the first time span and the second time span needs to be constant. Similarly, in the receive-end device 20, a transmit delay needs to be symmetrical to a receive delay. However, the first channel medium conversion module 101 and the second channel medium conversion module 201 differ in processing types and signal processing amounts concerning a transmitted signal and a received signal. Therefore, a transmit link delay is unequal to a receive link delay, and a difference between the transmit link delay and the receive link delay is inconstant. Therefore, precise time compensation cannot be performed, reducing time synchronization precision.

To resolve the problem of relatively low time synchronization precision, based on the architecture of the system shown in FIG. 2, stamping points for generating timestamps in the system are moved from physical layer (PHY) chips in the transmit-end device 10 and the receive-end device 20 to the first channel medium conversion module 101 and the second channel medium conversion module 201. Using the transmit-end device 10 as an example, the first channel medium conversion module 101 sends a header signal to the second medium conversion module 201, and at the same time, the transmit-end device 10 generates a first timestamp. A fourth timestamp may also be generated in the transmit-end device 10 when the first channel medium conversion module 101 receives a header signal sent by the receive-end device 20. Similarly, a second timestamp is generated when the second channel medium conversion module 201 in the receive-end device 20 receives a header signal sent by the transmit-end device 10, and a third timestamp may also be generated in the receive-end device 20 when the second channel medium conversion module 201 sends a header signal to the transmit-end device 10.

Figure 3:
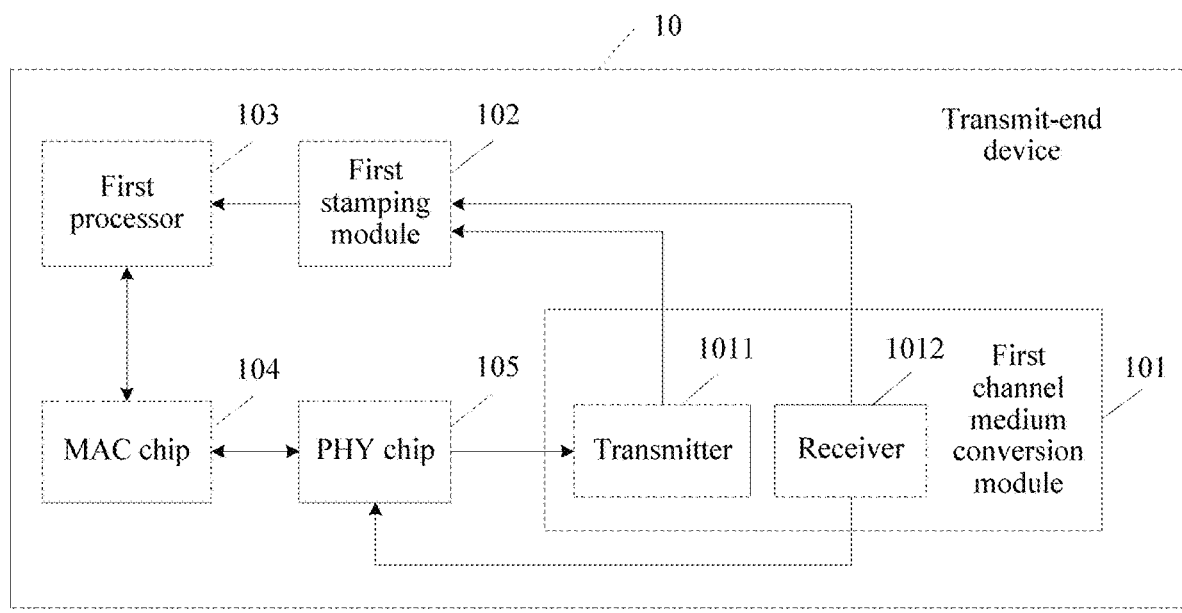
FIG. 3 is a schematic structural diagram of a transmit-end device according to at least an embodiment of the present disclosure.
Figure 4:
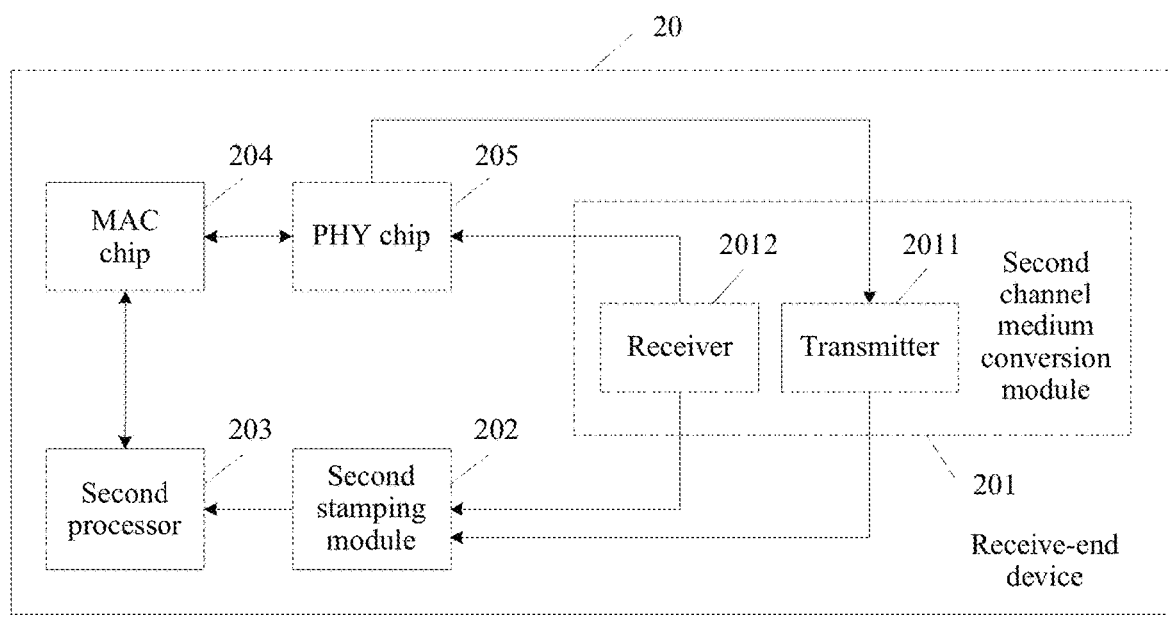
FIG. 4 is a schematic structural diagram of a receive-end device according to at least an embodiment of the present disclosure.

Specifically, refer to FIG. 3 and FIG. 4. FIG. 3 is a schematic structural diagram of a transmit-end device 10 according to an embodiment of the present disclosure. FIG. 4 is a schematic structural diagram of a receive-end device 20 according to an embodiment of the present disclosure. The transmit-end device 10 further includes a first stamping module 102, a first processor 103, a media access control (media access control, MAC) chip 104, and a PHY chip 105. The receive-end device 20 further includes a second stamping module 202, a second processor 203, a MAC chip 204, and a PHY chip 205. In the transmit-end device 10, a process of transmitting a message that carries a timestamp is as follows: The first stamping module 102 sends a generated timestamp to the first processor 103. The first processor 103 generates a message, and adds the timestamp to the message. The message is encapsulated by the MAC chip 104 and the PHY chip 105 in the transmit-end device 10, to obtain a data bit stream, and the data bit stream is sent to a first channel medium conversion module 101. The first channel medium conversion module 101 performs pre-transmission processing, such as channel coding, on the data bit stream; converts a processed data bit stream into a signal, for example, an optical signal, that can be transmitted on a transmission medium; and sends the signal to a second channel medium conversion module 201 in the receive-end device 20. After receiving the optical signal, the second channel medium conversion module 201 converts the optical signal into a data bit stream. The data bit stream is decapsulated by the PHY chip 205 and the MAC chip 204 and then sent to the second processor 203. A timestamp generation and transmission process in the receive-end device 20 is similar to that in the transmit-end device 10. Details are not described again.

The first channel medium conversion module 101 may include a receiver 1012 and a transmitter 1011. The receiver 1012 and the transmitter 1011 may be integrated into one chip. The receiver 1012 is configured to receive a data bit stream sent by the receive-end device 20. The data bit stream is decapsulated, by the PHY chip 105 and the MAC chip 104, into a message that carries a timestamp; and the message is transmitted to the first processor 103. The receiver 1012 may further receive and identify a header signal, and send a trigger signal for triggering timestamping to the first stamping module 102. The transmitter 1011 is configured to receive the data bit stream processed by the MAC chip 104 and the PHY chip 105 in the transmit-end device 10, and send the data bit stream to the receive-end device 20. The transmitter 1011 is further configured to send a header signal to the receive-end device 20, and send a trigger signal for triggering stamping to the first stamping module 102. The first stamping module 102 may send a timestamp to the first processor 103.

The second channel medium conversion module 201 may include a receiver 2012 and a transmitter 2011. The receiver 2012 and the transmitter 2011 may be integrated into one chip. The receiver 2012 is configured to receive a data bit stream sent by the transmit-end device 10. The data bit stream is decapsulated, by the PHY chip 205 and the MAC chip 204, into a message that carries a timestamp; and the message is transmitted to the second processor 203. The receiver 2012 may further receive and identify a header signal, and send a trigger signal for triggering timestamping to the second stamping module 202. The transmitter 2011 is configured to receive the data bit stream processed by the MAC chip 204 and the PHY chip 205 in the receive-end device 20, and send the data bit stream to the transmit-end device 10. The transmitter 2011 is further configured to send a header signal to the transmit-end device 10, and send a trigger signal for triggering stamping to the second stamping module 202. The second stamping module 202 may send a timestamp to the second processor 203.

The first processor 103 and the second processor 203 each may be a central processing unit (central processing unit, CPU) or a network processor (network processor, NP). The first processor 103 and the second processor 203 are configured to generate and send messages, where the messages may include a synchronization message, a delay request message, and a delay response message. The first stamping module 102 and the second stamping module 202 are configured to generate timestamps. The first stamping module 102 may generate a timestamp when receiving a trigger signal sent by the first channel medium conversion module 101. The second stamping module 202 may generate a timestamp when receiving a trigger signal sent by the second channel medium conversion module 201. The first stamping module 102 and the second stamping module 202 each may be implemented by using, for example, a field programmable gate array (FPGA). All or some of components in each of the transmit-end device 10 and the receive-end device 20 may be integrated into one component or disposed separately as required.

Figure 5A:
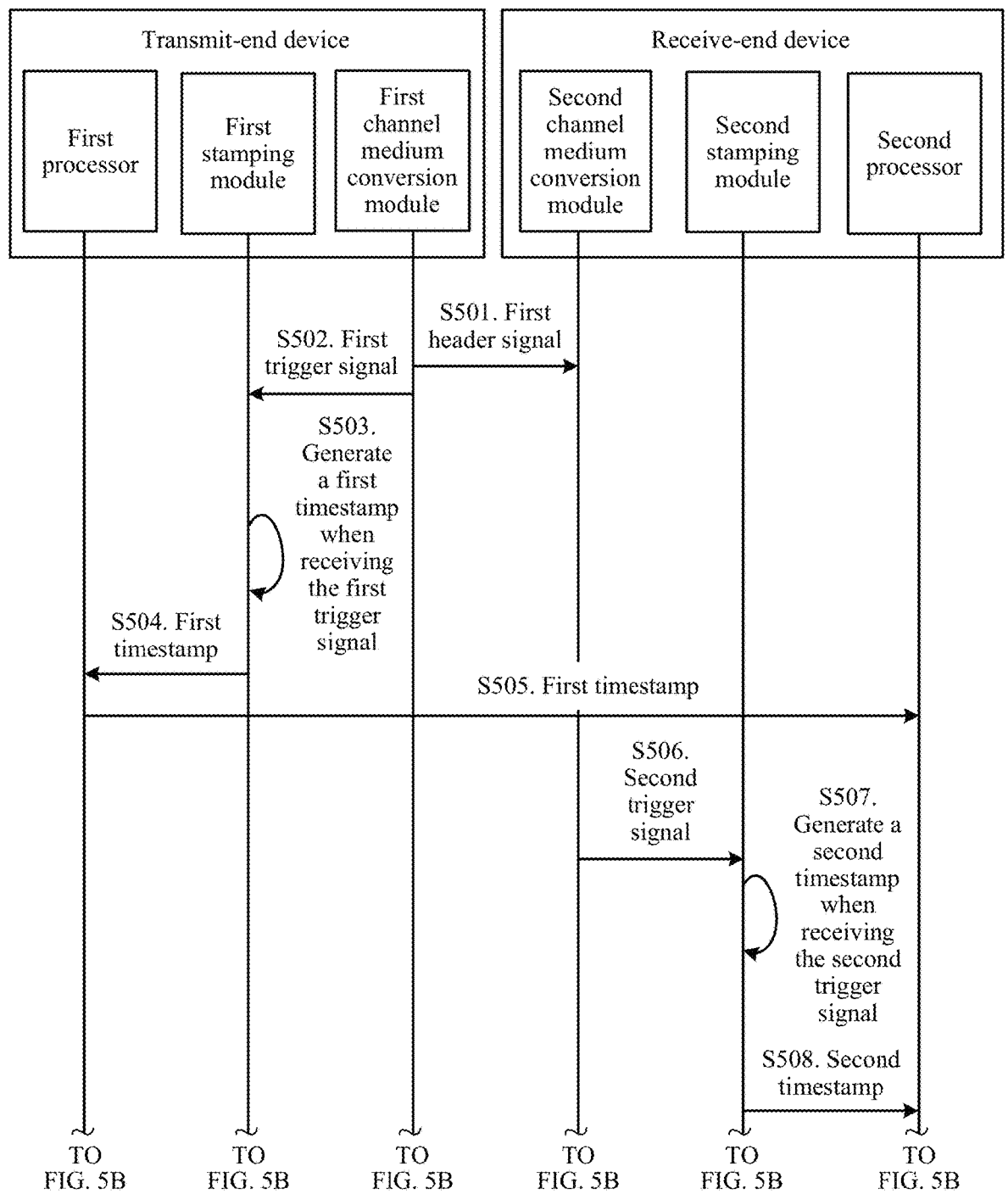
FIG. 5A and FIG. 5B are a schematic flowchart of a time synchronization method according to at least an embodiment of the present disclosure.
Figure 5B:
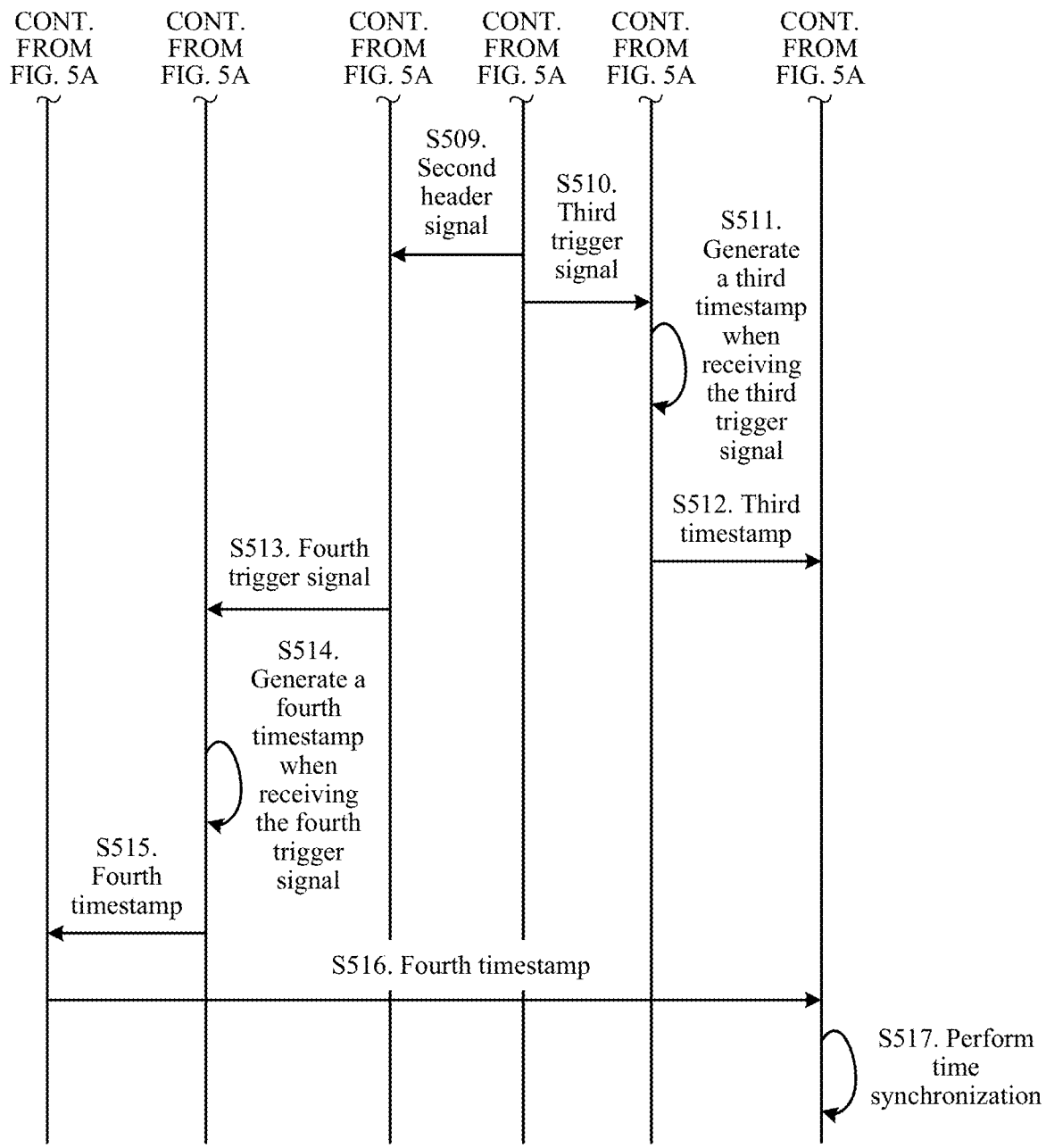

Based on the architecture of the system shown in FIG. 2 and the structures of the transmit-end device and the receive-end device shown in FIG. 3 and FIG. 4, refer to FIG. 5A and FIG. 5B. FIG. 5A and FIG. 5B are a schematic flowchart of a time synchronization method according to an embodiment of the present disclosure. As shown in FIG. 5A and FIG. 5B, the time synchronization method may include the following steps.

S501. A first channel medium conversion module in a transmit-end device sends a first header signal to a receive-end device.

The transmit-end device and the receive-end device continuously transmit data frames to each other. The data frames may be data frames of an existing service flow between the transmit-end device and the receive-end device. The transmit-end device may send a data frame to the receive-end device or receive a data frame from the receive-end device by using the first channel medium conversion module. The receive-end device may send a data frame to the transmit-end device or receive a data frame from the transmit-end device by using a second channel medium conversion module. A data frame includes a frame header. The transmit-end device and the receive-end device can identify the frame header in the received data frame. The first header signal may be a frame header of a data frame sent by the transmit-end device. When the data frames are data frames of an existing service flow, time synchronization precision can be improved while an existing service is compatible. A service flow may be a data bit stream of communication between the transmit-end device and the receive-end device.

S502. The first channel medium conversion module in the transmit-end device sends a first trigger signal to a first stamping module.

Specifically, the first channel medium conversion module sends the first trigger signal to the first stamping module simultaneously when sending the first header signal to the second channel medium conversion module in the receive-end device.

Specifically, the first channel medium conversion module and the second channel medium conversion module each may be provided with a counter locally, to count a quantity of frame headers (namely, header signals) of data frames transmitted between the transmit-end device and the receive-end device. The following may be set in the transmit-end device and the receive-end device: When the first channel medium conversion module detects that a quantity of transmitted header signals is a preset value N (in other words, detects the $N^{th}$ header signal, where the $N^{th}$ header signal is the transmitted first header signal), the first channel medium conversion module sends the first trigger signal to the first stamping module. If the first channel medium conversion module detects that the quantity of transmitted header signals does not reach the preset value N, the first channel medium conversion module continues to send a header signal and counts an accumulative quantity of header signals. When the second channel medium conversion module in the receive-end device detects that a quantity of received header signals sent by the first channel medium conversion module is the preset value N (in other words, detects that the $N^{th}$ header signal is received, where the $N^{th}$ header signal is the received first header signal), the second channel medium conversion module sends a second trigger signal to a second stamping module. If the second channel medium conversion module detects that the quantity of received header signals does not reach the preset value, the second channel medium conversion module continues to receive a header signal and counts an accumulative quantity of header signals. The preset value N may be 1 or a positive integer greater than 1.

For example, it may be set in the transmit-end device and the receive-end device that a channel medium conversion module sends one trigger signal to a local stamping module each time detecting 100 header signals.

S503. The first stamping module in the transmit-end device generates a first timestamp when receiving the first trigger signal.

Specifically, when receiving the first trigger signal, the first stamping module generates the first timestamp based on a system clock in the transmit-end device. The first timestamp indicates a first moment at which the first stamping module receives the first trigger signal, namely, a moment at which the first channel medium conversion module sends the first header signal.

S504. The first stamping module sends the first timestamp to a first processor.

S505. The first processor sends the first timestamp to the receive-end device.

Specifically, when receiving the first timestamp, the first processor generates a synchronization message, namely, a synchronization packet. In the 1588V2 synchronization protocol, the synchronization packet is a sync packet. A sync packet generated each time is used to carry a first timestamp generated in the current time. An originTimestamp field in the sync packet is used to carry the first timestamp, and other fields may be set correspondingly based on functions of the corresponding fields. This is not limited in this embodiment.

Before the first processor sends, to the receive-end device, the synchronization message that carries the first timestamp, the synchronization message that carries the first timestamp is encapsulated by a MAC chip and a PHY chip. This may include adding a MAC header; performing physical-layer code conversion, for example, physical coding sublayer (physical coding sublayer, PCS) processing; and the like. A data bit stream is obtained after the synchronization message that carries the first timestamp is encapsulated by the MAC chip and the PHY chip. The PHY chip sends the data bit stream to the first channel medium conversion module. The first channel medium conversion module converts the data bit stream, for example, performs channel coding on the data bit stream; and converts the data bit stream in a form of an electrical signal into a signal that can be transmitted between the first channel medium conversion module and the second channel medium conversion module. For example, the first channel medium conversion module and the second channel medium conversion module may be optical modules. Then, the data bit stream in the form of an electrical signal is converted into an optical signal, and the optical signal is transmitted between the optical module in the transmit-end device and the optical module in the receive-end device by using an optical fiber. Alternatively, the optical signal may be transmitted to the receive-end device over the air. In this case, the optical signal is transmitted over the air. Alternatively, the first channel medium conversion module and the second channel medium conversion module may be configured to convert the data bit stream in the form of an electrical signal into a signal that can be transmitted in a transmission medium such as a copper wire, and transmit the signal in the transmission medium.

After receiving the signal sent by the first channel medium conversion module, the second channel medium conversion module in the receive-end device converts the signal into an electrical signal, namely, a data bit stream. The data bit stream is decapsulated by a PHY chip and a MAC chip, to restore the synchronization message, and the synchronization message is sent to a second processor. The second processor may store, in a memory of the receive-end device, the first timestamp extracted from the synchronization message.

The first processor may generate a synchronization message periodically, and a generation period is the same as a trigger signal generation period. The synchronization message is used to carry a periodically updated first timestamp. In addition, to reduce a probability of disorder, before the first stamping module receives a next trigger signal, the first processor may send a synchronization message that carries a first timestamp of a current time.

S506. The second channel medium conversion module sends the second trigger signal to the second stamping module.

Specifically, the second channel medium conversion module sends the second trigger signal to the second stamping module when receiving the first header signal. A counter may be embedded in the second channel medium conversion module, and is configured to count a quantity of received header signals. When detecting that the $N^{th}$ header signal is received (to be specific, when the counter reaches the preset value N, where the $N^{th}$ header signal is the first header signal), the second channel medium conversion module may generate the second trigger signal and send the second trigger signal to the second stamping module.

S507. The second stamping module generates a second timestamp when receiving the second trigger signal.

Specifically, when receiving the second trigger signal, the second stamping module generates the second timestamp based on a system clock in the receive-end device. The second timestamp indicates a second moment at which the second stamping module receives the second trigger signal, namely, a moment at which the second channel medium conversion module receives the first header signal.

S508. The second stamping module sends the second timestamp to the second processor.

The second processor may store the second timestamp in the memory of the receive-end device.

S509. The second channel medium conversion module in the receive-end device sends a second header signal to the transmit-end device.

Refer to S501. The second header signal is similar to the first header signal, and may also be a frame header of a data frame transmitted between the transmit-end device and the receive-end device. The transmit-end device can identify a frame header of a data frame from the receive-end device.

S510. The second channel medium conversion module sends a third trigger signal to the second stamping module.

Specifically, the second channel medium conversion module sends the third trigger signal to the second stamping module while sending the second header signal to the transmit-end device. The second channel medium conversion module may include a counter for counting header signals. When detecting that a quantity of header signals sent by the second channel medium conversion module to the transmit-end device reaches a preset value M, the second channel medium conversion module generates and sends the third trigger signal. For a process of generating the third trigger signal, refer to step S502. Details are not described herein again.

S511. The second stamping module generates a third timestamp when receiving the third trigger signal.

Specifically, when receiving the third trigger signal, the second stamping module generates the third timestamp based on the system clock in the receive-end device. The third timestamp indicates a third moment at which the second stamping module receives the third trigger signal, namely, a moment at which the second channel medium conversion module sends the second header signal.

S512. The second stamping module sends the third timestamp to the second processor.

Specifically, the second processor may store the third timestamp in the memory of the receive-end device.

S513. The first channel medium conversion module sends a fourth trigger signal to the first stamping module.

Specifically, when the first channel medium conversion module receives the second header signal, the first channel medium conversion module sends the fourth trigger signal to the first stamping module. A counter may be embedded in the first channel medium conversion module, and is configured to count a quantity of received header signals. When detecting that the $M^{th}$ header signal is received (to be specific, when the counter reaches the preset value M, where the $M^{th}$ header signal is the second header signal), the first channel medium conversion module may generate the fourth trigger signal and send the fourth trigger signal to the first stamping module.

S514. The first stamping module generates a fourth timestamp when receiving the fourth trigger signal.

Specifically, when receiving the fourth trigger signal, the first stamping module generates the fourth timestamp based on the system clock in the transmit-end device. The fourth timestamp indicates a fourth moment at which the first stamping module receives the fourth trigger signal, namely, a moment at which the first channel medium conversion module receives the second header signal.

S515. The first stamping module sends the fourth timestamp to the first processor.

S516. The first processor sends the fourth timestamp to the receive-end device.

Specifically, when receiving the fourth timestamp, the first processor generates a delay response message, namely, a delay response packet. In the 1588V2 synchronization protocol, the delay response packet is a Delay_Resp packet. A Delay_Resp packet generated each time is used to carry a fourth timestamp generated in the current time. An origin-Timestamp field in the Delay_Resp packet may be used to carry the fourth timestamp.

Before the first processor sends, to the receive-end device, the delay response message that carries the fourth timestamp, the delay response message that carries the fourth timestamp is encapsulated by the MAC chip and the PHY chip. This may include adding a MAC header; performing physical-layer code conversion, for example, PCS processing; and the like. A data bit stream is obtained after the delay response message that carries the fourth timestamp is encapsulated by the MAC chip and the PHY chip. The PHY chip sends the data bit stream to the first channel medium conversion module. The first channel medium conversion module converts the data bit stream, for example, performs channel coding on the data bit stream; and converts the data bit stream in a form of an electrical signal into a signal that can be transmitted between the first channel medium conversion module and the second channel medium conversion module. For example, the first channel medium conversion module and the second channel medium conversion module may be optical modules. Then, the data bit stream in the form of an electrical signal is converted into an optical signal, and the optical signal is transmitted between the optical module in the transmit-end device and the optical module in the receive-end device by using an optical fiber. Alternatively, the optical signal may be transmitted to the receive-end device over the air. In this case, the optical signal is transmitted over the air. Alternatively, the first channel medium conversion module and the second channel medium conversion module may be configured to convert the data bit stream in the form of an electrical signal into a signal that can be transmitted in a transmission medium such as a copper wire, and transmit the signal in the transmission medium.

When receiving the signal sent by the first channel medium conversion module, the second channel medium conversion module in the receive-end device converts the signal into an electrical signal, namely, a data bit stream. Then the data bit stream is decapsulated by the PHY chip and the MAC chip, to restore the delay response message; and the delay response message is sent to the second processor. The second processor may store the fourth timestamp in the memory of the receive-end device.

S517. The receive-end device synchronizes time with the transmit-end device based on the first moment, the second moment, the third moment, and the fourth moment.

Specifically, the receive-end device synchronizes time with the transmit-end device based on the first moment, the second moment, the third moment, and the fourth moment that are respectively indicated by the first timestamp, the second timestamp, the third timestamp, and the fourth timestamp. For a specific time synchronization method, refer to the time synchronization principle described in FIG. 1. Details are not described herein again. The first timestamp, the second timestamp, the third timestamp, and the fourth timestamp are respectively information, for example, character strings or coded information, indicating the first moment, the second moment, the third moment, and the fourth moment.

In the time synchronization method described in FIG. 5A and FIG. 5B, when receiving or sending a header signal, the first channel medium conversion module in the transmit-end device sends a trigger signal for triggering timestamping to the first stamping module, and the first stamping module generates a timestamp; or when receiving or sending a header signal, the second channel medium conversion module in the receive-end device sends a trigger signal for triggering timestamping to the second stamping module, and the second stamping module generates a timestamp. In the foregoing method, a stamping point on a physical layer is moved to the channel medium conversion modules, so that a moment indicated by a timestamp is closer to a moment at which a signal enters or leaves a transmission medium. This reduces an uncertainty about a delay of transmitting a message between a stamping point and a physical layer medium and can improve precision of a timestamping moment, thereby improving precision of time synchronization between the receive-end device and the transmit-end device.

Figure 6:
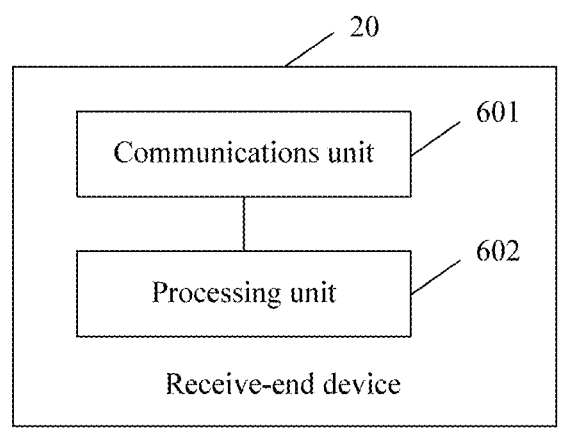
FIG. 6 is a schematic structural diagram of another receive-end device according to at least an embodiment of the present disclosure.

Based on the architecture of the system shown in FIG. 2, refer to FIG. 6. FIG. 6 is a schematic structural diagram of another receive-end device 20 according to an embodiment of the present disclosure. As shown in FIG. 6, the receive-end device 20 may include a communications unit 601 and a processing unit 602.

The communications unit 601 is configured to receive a first timestamp sent by a transmit-end device 10, and receive a first header signal sent by the transmit-end device 10, where the first header signal is sent by a first channel medium conversion module in the transmit-end device 10, the first timestamp indicates a first moment at which the first channel medium conversion module sends the first header signal, and a moment at which the receive-end device 20 receives the first header signal is a second moment;

the communications unit 601 is further configured to send a second header signal to the transmit-end device 10, where a moment at which a second channel medium conversion module sends the second header signal is a third moment;

the communications unit 601 is further configured to receive a fourth timestamp sent by the transmit-end device 10, where the fourth timestamp indicates a fourth moment at which the transmit-end device 10 receives the second header signal; and the processing unit 602 is configured to synchronize time with the transmit-end device 10 based on the first moment, the second moment, the third moment, and the fourth moment.

In a possible implementation, the first moment is a moment at which a first stamping module in the transmit-end device 10 receives a first trigger signal sent by the first channel medium conversion module, the second moment is a moment at which a second stamping module in the receive-end device 20 receives a second trigger signal sent by the second channel medium conversion module, the third moment is a moment at which the second stamping module receives a third trigger signal sent by the second channel medium conversion module, and the fourth moment is a moment at which the first stamping module receives a fourth trigger signal sent by the first channel medium conversion module.

In a possible implementation, the first header signal is received by the second channel medium conversion module, and after the second channel medium conversion module receives the first header signal sent by the first channel medium conversion module, the second channel medium conversion module sends the second trigger signal to the second stamping module; and when the second stamping module receives the second trigger signal, the second stamping module generates a second timestamp and sends the second timestamp to a second processor in the receive-end device 20, where the second timestamp indicates the second moment.

In a possible implementation, after the second channel medium conversion module sends the second header signal to the first channel medium conversion module, the second channel medium conversion module sends the third trigger signal to the second stamping module; and the second stamping module generates a third timestamp when the second stamping module receives the third trigger signal, and sends the third timestamp to the second processor in the receive-end device, where the third timestamp indicates the third moment.

The communications unit 601 may be configured to implement the functions of the second channel medium conversion module, and the processing unit 602 may be configured to implement the functions of the second processor and the second stamping module.

It should be noted that, for implementation of each unit, reference may be further made to corresponding descriptions in the embodiment of the time synchronization method shown in FIG. 5A and FIG. 5B.

Figure 7:
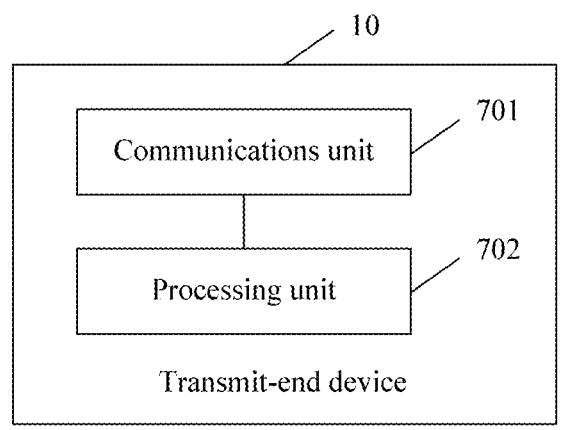
FIG. 7 is a schematic structural diagram of another transmit-end device according to at least an embodiment of the present disclosure.

Based on the architecture of the system shown in FIG. 2, refer to FIG. 7. FIG. 7 is a schematic structural diagram of another transmit-end device 10 according to an embodiment of the present disclosure. As shown in FIG. 7, the transmit-end device 10 may include a communications unit 701 and a processing unit 702.

The communications unit 701 is configured to send a first timestamp and a first header signal to a receive-end device 20, where the first header signal is sent by a first channel medium conversion module in the transmit-end device 10, the first timestamp indicates a first moment at which the first channel medium conversion module sends the first header signal, and a moment at which the receive-end device 20 receives the first header signal is a second moment.

The communications unit 701 is further configured to receive a second header signal sent by the receive-end device 20, where the second header signal is sent by a second channel medium conversion module in the receive-end device 20, a moment at which the receive-end device 20 sends the second header signal is a third moment, and a moment at which the transmit-end device 10 receives the second header signal is a fourth moment.

The communications unit 701 is further configured to send a fourth timestamp to the receive-end device 20, so that the receive-end device 20 can synchronize time with the transmit-end device 10 based on the first moment, the second moment, the third moment, and the fourth moment, where the fourth timestamp indicates the fourth moment.

The processing unit 702 is configured to communicate with the communications unit 701.

In a possible implementation, the first moment is a moment at which a first stamping module in the transmit-end device 10 receives a first trigger signal sent by the first channel medium conversion module, the second moment is a moment at which a second stamping module in the receive-end device 20 receives a second trigger signal sent by the second channel medium conversion module, the third moment is a moment at which the second stamping module receives a third trigger signal sent by the second channel medium conversion module, and the fourth moment is a moment at which the first stamping module receives a fourth trigger signal sent by the first channel medium conversion module.

In a possible implementation, after the communications unit 701 sends the first header signal to the second channel medium conversion module, the communications unit 701 is further configured to send the first trigger signal to the first stamping module; and the processing unit 702 is further configured to generate the first timestamp when receiving the first trigger signal.

In a possible implementation, the communications unit 701 is further configured to send the fourth trigger signal to the first stamping module after the first channel medium conversion module receives the second header signal sent by the second channel medium conversion module; and the processing unit 702 is further configured to generate the fourth timestamp when receiving the fourth trigger signal.

In a possible implementation, the communications unit 701 sends a first timestamp to a receive-end device includes:

the processing unit 702 is configured to: after receiving the first timestamp sent by the first stamping module, send a synchronization message to the receive-end device by using the first channel medium conversion module, where the synchronization message carries the first timestamp.

In a possible implementation, the transmit-end device sends the fourth timestamp to the receive-end device includes: a first processor in the transmit-end device sends, after receiving the fourth timestamp sent by the first stamping module, a delay response message to the receive-end device by using the first channel medium conversion module, where the delay response message carries the fourth timestamp.

The communications unit 701 may be configured to implement the functions of the first channel medium conversion module, and the processing unit 702 may be configured to implement the functions of the first processor and the first stamping module.

It should be noted that, for implementation of each unit, reference may be further made to corresponding descriptions in the embodiment of the time synchronization method shown in FIG. 5A and FIG. 5B.

Figure 8:
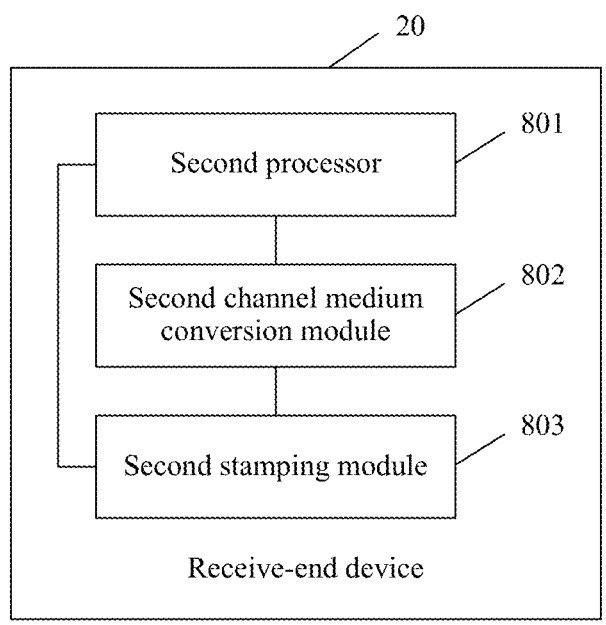
FIG. 8 is a schematic structural diagram of still another receive-end device according to at least an embodiment of the present disclosure.

Based on the architecture of the system shown in FIG. 2, refer to FIG. 8. FIG. 8 is a schematic structural diagram of still another receive-end device 20 according to an embodiment of the present disclosure. As shown in FIG. 8, the receive-end device 20 may include a second processor 801 and a second channel medium conversion module 802. A communication connection is established between the second processor 801 and the second channel medium conversion module 802.

The second channel medium conversion module 802 is configured to receive a first timestamp sent by a transmit-end device and receive a first header signal sent by the transmit-end device, where the first header signal is sent by a first channel medium conversion module in the transmit-end device, the first timestamp indicates a first moment at which the first channel medium conversion module sends the first header signal, and a moment at which the receive-end device receives the first header signal is a second moment.

The second channel medium conversion module 802 is further configured to send a second header signal to the transmit-end device, where a moment at which the second channel medium conversion module 802 sends the second header signal is a third moment.

The second channel medium conversion module 802 is further configured to receive a fourth timestamp sent by the transmit-end device, where the fourth timestamp indicates a fourth moment at which the transmit-end device receives the second header signal.

The second processor 801 is configured to synchronize time with the transmit-end device based on the first moment, the second moment, the third moment, and the fourth moment.

In a possible implementation, the receive-end device further includes a second stamping module 803, the first moment is a moment at which a first stamping module in the transmit-end device 10 receives a first trigger signal sent by the first channel medium conversion module, the second moment is a moment at which the second stamping module 803 in the receive-end device 20 receives a second trigger signal sent by the second channel medium conversion module 802, the third moment is a moment at which the second stamping module 803 receives a third trigger signal sent by the second channel medium conversion module 802, and the fourth moment is a moment at which the first stamping module receives a fourth trigger signal sent by the first channel medium conversion module.

In a possible implementation, after the second channel medium conversion module 802 receives the first header signal sent by the first channel medium conversion module, the second channel medium conversion module 802 is further configured to send the second trigger signal to the second stamping module; and the second stamping module 803 is configured to generate a second timestamp when receiving the second trigger signal, and send the second timestamp to the second processor 801, where the second timestamp indicates the second moment.

In a possible implementation, after the second channel medium conversion module 802 sends the second header signal to the first channel medium conversion module, the second channel medium conversion module 802 is further configured to send the third trigger signal to the second stamping module 803; and the second stamping module 803 is further configured to generate a third timestamp when receiving the third trigger signal, and send the third timestamp to the second processor 801, where the third timestamp indicates the third moment.

For implementation of each module, refer to corresponding descriptions in the embodiment of the time synchronization method shown in FIG. 5A and FIG. 5B.

Figure 9:
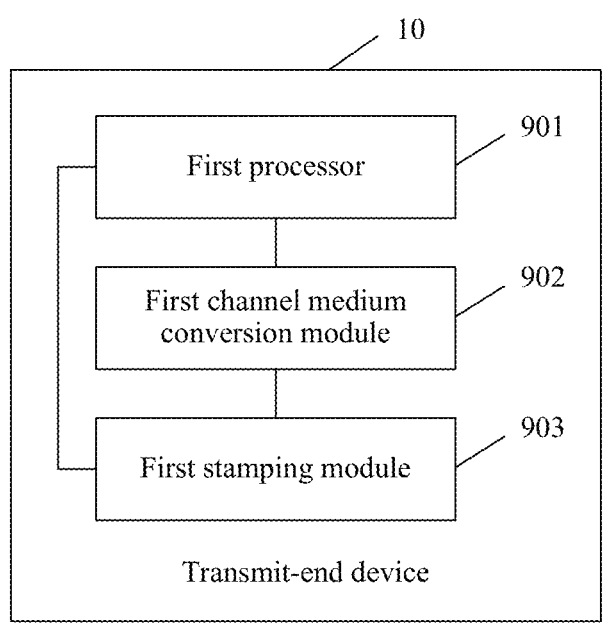
FIG. 9 is a schematic structural diagram of still another transmit-end device according to at least an embodiment of the present disclosure.

Based on the architecture of the system shown in FIG. 2, refer to FIG. 9. FIG. 9 is a schematic structural diagram of still another transmit-end device 10 according to an embodiment of the present disclosure. As shown in FIG. 9, the transmit-end device 10 may include a first processor 901 and a first channel medium conversion module 902. A communication connection is established between the first processor 901 and the first channel medium conversion module 902.

The first channel medium conversion module 902 is configured to send a first timestamp to a receive-end device and send a first header signal to the receive-end device, where the first header signal is sent by the first channel medium conversion module 902 in the transmit-end device, the first timestamp indicates a first moment at which the first channel medium conversion module 902 sends the first header signal, and a moment at which the receive-end device receives the first header signal is a second moment.

The first channel medium conversion module 902 is further configured to receive a second header signal sent by the receive-end device, where the second header signal is sent by a second channel medium conversion module in the receive-end device, a moment at which the receive-end device sends the second header signal is a third moment, and a moment at which the transmit-end device 10 receives the second header signal is a fourth moment.

The first channel medium conversion module 902 is further configured to send a fourth timestamp to the receive-end device, so that the receive-end device can synchronize time with the transmit-end device based on the first moment, the second moment, the third moment, and the fourth moment, where the fourth timestamp indicates the fourth moment.

The first processor 901 is configured to communicate with the first channel medium conversion module 902.

In a possible implementation, the transmit-end device 10 further includes a first stamping module 903, the first moment is a moment at which the first stamping module 903 receives a first trigger signal sent by the first channel medium conversion module 902, the second moment is a moment at which a second stamping module in the receive-end device receives a second trigger signal sent by the second channel medium conversion module, the third moment is a moment at which the second stamping module receives a third trigger signal sent by the second channel medium conversion module, and the fourth moment is a moment at which the first stamping module 903 receives a fourth trigger signal sent by the first channel medium conversion module 902.

In a possible implementation, after the first channel medium conversion module 902 sends the first header signal to the second channel medium conversion module, the first channel medium conversion module 902 is further configured to send the first trigger signal to the first stamping module 903; and the first stamping module 903 is configured to generate the first timestamp when receiving the first trigger signal, and send the first timestamp to the first processor 901.

In a possible implementation, the first channel medium conversion module 902 is further configured to send the fourth trigger signal to the first stamping module 903 after receiving the second header signal sent by the second channel medium conversion module; and the first stamping module 903 is further configured to generate the fourth timestamp when receiving the fourth trigger signal, and send the fourth timestamp to the first processor 901.

In a possible implementation, the first channel medium conversion module 902 is configured to send a first timestamp to a receive-end device includes:

the first processor 901 sends, after receiving the first timestamp sent by the first stamping module, a synchronization message to the receive-end device by using the first channel medium conversion module, where the synchronization message carries the first timestamp.

In a possible implementation, the first channel medium conversion module 902 is further configured to send a fourth timestamp to the receive-end device includes: the first processor in the transmit-end device 10 sends, after receiving the fourth timestamp sent by the first stamping module 903, a delay response message to the receive-end device by using the first channel medium conversion module 902, where the delay response message carries the fourth timestamp.

For implementation of each module, refer to corresponding descriptions in the embodiment of the time synchronization method shown in FIG. 5A and FIG. 5B.

Based on the architecture of the system shown in FIG. 2, an embodiment of the present disclosure provides a communications system. As shown in FIG. 2, the communications system includes a transmit-end device 10 and a receive-end device 20. The receive-end device 20 is one of the receive-end device provided in the embodiment described in FIG. 3, the receive-end device provided in the embodiment described in FIG. 6, or the receive-end device provided in the embodiment described in FIG. 8. The transmit-end device 10 is one of the transmit-end device provided in the embodiment described in FIG. 4, the trans-mit-end device provided in the embodiment described in FIG. 7, or the receive-end device provided in the embodiment described in FIG. 9.

For implementation of each module, refer to corresponding descriptions in the embodiment of the time synchronization method shown in FIG. 5A and FIG. 5B.

A person skilled in the art should understand that the embodiments of the present disclosure may be provided as a method, a system, or a computer program product. Therefore, all or some of the embodiments of the present disclosure may be implemented by using software, hardware, firmware, or any combination thereof. Moreover, the embodiments of the present disclosure may use a form of a computer program product that is implemented on one or more computer-usable storage media (including but not limited to a disk memory, an optical memory, and the like) that include computer-usable program code.

The embodiments of present disclosure are described with reference to the flowcharts and/or block diagrams of the method, the device (system), and the computer program product. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

A person of ordinary skill in the art may understand that all or some of the processes of the methods in the embodiments may be implemented by a computer program instructing related hardware. The program may be stored in a computer readable storage medium. When the program runs, the processes of the method embodiments are performed. The foregoing storage medium includes any medium that can store program code, such as a ROM, a random access memory RAM, a magnetic disk, an optical disc, or the like.

What is claimed is:

1. A time synchronization method, comprising:
 receiving, by a receive-end device, a first timestamp sent by a transmit-end device, and receiving a first header signal sent by the transmit-end device, wherein the first header signal is sent by a first channel medium conversion module in the transmit-end device, the first timestamp indicates a first moment at which the first channel medium conversion module sends the first header signal and generates a first trigger signal that is received by a first stamping module, and a second timestamp corresponds a second moment at which the receive-end device receives the first header signal;

generating, by a second channel medium conversion module, a second trigger signal responsive to receiving the first header signal, the second moment including a moment at which a second stamping module in the receive-end device receives the second trigger signal sent by the second channel medium conversion module;

sending, by the second channel medium conversion module, a second header signal to the transmit-end device, wherein the second header signal is sent by the second channel medium conversion module in the receive-end device, and a third timestamp corresponds to a third moment at which the receive-end device sends the second header signal;

sending, by the second channel medium conversion module, a third trigger signal to the second stamping module responsive to sending the second header signal to the first channel medium conversion module;

receiving, by the receive-end device, a fourth timestamp sent by the transmit-end device, wherein the fourth timestamp indicates a fourth moment at which the transmit-end device receives the second header signal; and synchronizing, by the receive-end device, time with the transmit-end device based on the first moment, the second moment, the third moment, and the fourth moment.

2. The time synchronization method according to claim 1, wherein the first moment includes a moment at which the first stamping module in the transmit-end device receives the first trigger signal sent by the first channel medium conversion module, the third moment includes a moment at which the second stamping module receives the third trigger signal sent by the second channel medium conversion module, and the fourth moment includes a moment at which the first stamping module receives a fourth trigger signal sent by the first channel medium conversion module.

3. The method according to claim 2, wherein the first header signal is received by the second channel medium conversion module, and after the second channel medium conversion module receives the first header signal sent by the first channel medium conversion module, the method further comprises:

sending, by the second channel medium conversion module, the second trigger signal to the second stamping module;

generating, by the second stamping module, the second timestamp when the second stamping module receives the second trigger signal, and sending the second timestamp to a processor in the receive-end device, wherein the second timestamp indicates the second moment.

4. The method according to claim 2, wherein after the second channel medium conversion module sends the second header signal to the first channel medium conversion module, the method further comprises:

generating, by the second stamping module, the third timestamp when the second stamping module receives the third trigger signal, and sending the third timestamp to the processor in the receive-end device, wherein the third timestamp indicates the third moment.

5. A time synchronization method, comprising:

sending, by a transmit-end device, a first timestamp to a receive-end device, and sending a first header signal to the receive-end device, generating, by a first channel medium conversion module, a first trigger signal responsive to sending the first header signal, wherein the first header signal is sent by the first channel medium conversion module in the transmit-end device, the first timestamp indicates a first moment at which the first channel medium conversion module sends the first header signal, and a second timestamp corresponds to a second moment at which the receive-end device receives the first header signal, the first moment including a moment at which a first stamping module in the transmit-end device receives the first trigger signal sent by the first channel medium conversion module;

receiving, by the transmit-end device, a second header signal sent by the receive-end device, wherein the second header signal is sent by a second channel medium conversion module in the receive-end device, a third timestamp corresponds to a third moment at which the receive-end device sends the second header signal, and a fourth timestamp corresponds to a fourth moment at which the transmit-end device receives the second header signal;

and sending, by the transmit-end device, the fourth timestamp to the receive-end device, so that the receive-end device can synchronize time with the transmit-end device based on the first moment, the second moment, the third moment, and the fourth moment, wherein the fourth timestamp indicates the fourth moment, wherein a third trigger signal is sent by the second channel medium conversion module to a second stamping module of the receive-end device responsive to receiving, at the first channel medium conversion module, the second header signal from the second channel medium conversion module.

6. The time synchronization method according to claim 5, wherein, the second moment includes a moment at which a second stamping module in the receive-end device receives a second trigger signal sent by the second channel medium conversion module, the third moment includes a moment at which the second stamping module receives the third trigger signal sent by the second channel medium conversion module, and the fourth moment includes a moment at which the first stamping module receives a fourth trigger signal sent by the first channel medium conversion module.

7. The method according to claim 6, wherein after the first channel medium conversion module sends the first header signal to the second channel medium conversion module, the method further comprises: sending, by the first channel medium conversion module, the first trigger signal to the first stamping module; generating, by the first stamping module, the first timestamp when the first stamping module receives the first trigger signal, and sending the first timestamp to a processor in the transmit-end device.

8. The method according to claim 6, wherein the second header signal is received by the first channel medium conversion module, and after the first channel medium conversion module receives the second header signal sent by the second channel medium conversion module, the method further comprises: sending, by the first channel medium conversion module, the fourth trigger signal to the first stamping module; generating, by the first stamping module, the fourth timestamp when the first stamping module receives the fourth trigger signal, and sending the fourth timestamp to the processor in the transmit-end device.

9. The method according to claim 6, wherein the sending, by the transmit-end device, the first timestamp to the receive-end device comprises: sending, after receiving the first timestamp sent by the first stamping module, a synchronization message to the receive-end device by the first channel medium conversion module, wherein the synchronization message carries the first timestamp.

10. The method according to claim 6, wherein the sending, by the transmit-end device, the fourth timestamp to the receive-end device comprises: sending, after receiving the fourth timestamp sent by the first stamping module, a delay response message to the receive-end device by the first channel medium conversion module, wherein the delay response message carries the fourth timestamp.

11. A receive-end device, comprising:
a processor; and
a second channel medium conversion module configured to:
receive a first timestamp sent by a transmit-end device and receive a first header signal sent by the transmit-end device, wherein the first header signal is sent by a first channel medium conversion module in the transmit-end device, the first timestamp indicates a first moment at which the first channel medium conversion module sends the first header signal and generates a first trigger signal that is received by a first stamping module, and a second timestamp corresponding to a second moment at which the receive-end device receives the first header signal;
generate a second trigger signal responsive to the second channel medium conversion module being configured to receive the first header signal, the second moment including a moment at which a second stamping module in the receive-end device receives the second trigger signal sent by the second channel medium conversion module;
send a second header signal, by the second channel medium conversion module, to the transmit-end device, wherein a third timestamp corresponding to a third moment at which the second channel medium conversion module sends the second header signal;
sending, by the second channel medium conversion module, a third trigger signal to the second stamping module responsive to sending the second header signal to the first channel medium conversion module;
receive a fourth timestamp sent by the transmit-end device, wherein the fourth timestamp indicates a fourth moment at which the transmit-end device receives the second header signal; and
the processor is configured to synchronize time with the transmit-end device based on the first moment, the second moment, the third moment, and the fourth moment.

12. The receive-end device according to claim 11, wherein the receive-end device further comprises: the second stamping module, wherein the first moment includes a moment at which the first stamping module in the transmit-end device receives the first trigger signal sent by the first channel medium conversion module, the third moment includes a moment at which the second stamping module receives the third trigger signal sent by the second channel medium conversion module, and the fourth moment includes a moment at which the first stamping module receives a fourth trigger signal sent by the first channel medium conversion module.

13. The receive-end device according to claim 12, wherein after the second channel medium conversion module receives the first header signal sent by the first channel medium conversion module, the second channel medium conversion module is further configured to send the second trigger signal to the second stamping module; and the second stamping module is configured to generate the second timestamp when receiving the second trigger signal, and send the second timestamp to the processor, wherein the second timestamp indicates the second moment.

14. The receive-end device according to claim 12, wherein after the second channel medium conversion module sends the second header signal to the first channel medium conversion module, the second stamping module is further configured to generate the third timestamp when receiving the third trigger signal, and send the third timestamp to the processor, wherein the third timestamp indicates the third moment.

15. A transmit-end device, comprising:
a processor; and
a first channel medium conversion module configured to:
send a first timestamp to a receive-end device and send a first header signal to the receive-end device, generate a first trigger signal responsive to the first channel medium conversion module being configured to send the first header signal, wherein the first header signal is sent by the first channel medium conversion module in the transmit-end device, the first timestamp indicates a first moment at which the first channel medium conversion module sends the first header signal, and a second timestamp corresponding to a second moment at which the receive-end device receives the first header signal, the first moment including a moment at which a first stamping module in the transmit-end device receives the first trigger signal sent by the first channel medium conversion module;
receive a second header signal sent by the receive-end device, wherein the second header signal is sent by a second channel medium conversion module in the receive-end device, a third timestamp corresponding to a third moment at which the receive-end device sends the second header signal, and a fourth timestamp corresponding to a fourth moment at which the transmit-end device receives the second header signal; and
send the fourth timestamp to the receive-end device, so that the receive-end device can synchronize time with the transmit-end device based on the first moment, the second moment, the third moment, and the fourth moment, wherein the fourth timestamp indicates the fourth moment; and the processor is configured to communicate with the first channel medium conversion module,
wherein a third trigger signal is sent by the second channel medium conversion module to a second stamping module of the receive-end device responsive to receiving, at the first channel medium conversion module, the second header signal from the second channel medium conversion module.

16. The transmit-end device according to claim 15, wherein the transmit-end device further comprises: a first stamping module, wherein the second moment includes a moment at which a second stamping module in the receive-end device receives a second trigger signal sent by the second channel medium conversion module, the third moment includes a moment at which the second stamping module receives the third trigger signal sent by the second channel medium conversion module, and the fourth moment includes a moment at which the first stamping module receives a fourth trigger signal sent by the first channel medium conversion module.

17. The transmit-end device according to claim 16, wherein after the first channel medium conversion module sends the first header signal to the second channel medium conversion module, the first channel medium conversion module is further configured to send the first trigger signal to the first stamping module; and the first stamping module is configured to generate the first timestamp when receiving the first trigger signal, and send the first timestamp to the processor in the transmit-end device.

18. The transmit-end device according to claim 16, wherein the first channel medium conversion module is further configured to send the fourth trigger signal to the first stamping module after receiving the second header signal sent by the second channel medium conversion module; and the first stamping module is further configured to generate the fourth timestamp when receiving the fourth trigger signal, and send the fourth timestamp to the processor in the transmit-end device.

19. The transmit-end device according to claim 16, wherein the first channel medium conversion module is configured to send the first timestamp to the receive-end device comprises: the processor in the transmit-end device is further configured to send, after receiving the first timestamp sent by the first stamping module, a synchronization message to the receive-end device by using the first channel medium conversion module, wherein the synchronization message carries the first timestamp.

20. The transmit-end device according to claim 16, wherein the first channel medium conversion module is further configured to send a fourth timestamp to the receive-end device comprises: the processor in the transmit-end device is further configured to send, after receiving the fourth timestamp sent by the first stamping module, a delay response message to the receive-end device by using the first channel medium conversion module, wherein the delay response message carries the fourth timestamp.

\* \* \* \* \*